United States Patent
Gupta et al.

(10) Patent No.: US 7,908,249 B1
(45) Date of Patent: Mar. 15, 2011

(54) CLOSED-LOOP FEEDBACK CONTROL SYSTEM FOR ONLINE SERVICES

(75) Inventors: Anurag Gupta, Sunnyvale, CA (US); Steve S. Lin, San Jose, CA (US); Eric Ho, Cupertino, CA (US)

(73) Assignee: Yahoo! Inc., Sunnyvale, CA (US)

(*) Notice: Subject to any disclaimer, the term of this patent is extended or adjusted under 35 U.S.C. 154(b) by 808 days.

(21) Appl. No.: 11/105,873

(22) Filed: Apr. 13, 2005

(51) Int. Cl.
*G06F 7/00* (2006.01)
*G06F 17/00* (2006.01)

(52) U.S. Cl. ......... 707/655; 707/609; 707/662; 707/665

(58) Field of Classification Search .......... 707/100, 707/1, 101, 104.1, 999.001, 999.1, 999.101, 707/999.107
See application file for complete search history.

(56) References Cited

U.S. PATENT DOCUMENTS

| | | | | |
|---|---|---|---|---|
| 4,789,986 A | * | 12/1988 | Koizumi et al. | 714/797 |
| 5,423,023 A | * | 6/1995 | Batch et al. | 717/117 |
| 5,477,492 A | * | 12/1995 | Ohsaki et al. | 365/200 |
| 5,867,821 A | * | 2/1999 | Ballantyne et al. | 705/2 |
| 6,014,669 A | * | 1/2000 | Slaughter et al. | 707/610 |
| 6,148,306 A | * | 11/2000 | Seidl et al. | 707/104.1 |
| 6,564,264 B1 | * | 5/2003 | Creswell et al. | 709/245 |
| 6,704,737 B1 | * | 3/2004 | Nixon et al. | 707/101 |
| 7,213,027 B1 | * | 5/2007 | Kominek et | 707/102 |
| 2003/0191669 A1 | * | 10/2003 | Fitzgerald et al. | 705/2 |
| 2004/0030592 A1 | * | 2/2004 | Buck et al. | 705/10 |

OTHER PUBLICATIONS

Zisman et al., "Using XML to Build Consistency Rules for Distributed Specifications," Proceedings of the Tenth International Workshop on Software Specification and Design (IWSD'00), IEEE 2000, 8 pages.*

* cited by examiner

*Primary Examiner* — Tim T. Vo
*Assistant Examiner* — Garrett Smith
(74) *Attorney, Agent, or Firm* — Hickman Palermo Truong & Becker LLP

(57) ABSTRACT

A framework for identifying and resolving inconsistencies between multiple data sources is provided. Identification data that indicates rules for identifying inconsistencies between multiple data sources is stored. Rule data that indicates rules for resolving inconsistencies between the multiple data sources is also stored. The rules contained in the identification data are evaluated by an inconsistency identifier. Based on the evaluation, the inconsistency identifier generates output data that identifies the inconsistencies between the multiple data sources. The output data may be stored in a persistent store. Reports and user interfaces may be generated that present the generated output data. An inconsistency resolver processes the output data and the rule data to resolve one or more of the inconsistencies that are identified in the output data in a manner indicated by the rules represented in the rule data.

38 Claims, 11 Drawing Sheets

FIG. 4A

```
- <job>
    <name>Identification Data Example</name>           ⎫
    <owner>John Doe</owner>                            ⎬ 410
    <email>jdoe@domain.com</email>                     ⎭
  - <datasource>                                       ⎫
      <name>Data Source 102(1)</name>                  ⎪
      <accessor>Accessor 330(1)</accessor>             ⎪
      <accessor_args>datasource1.csv</accessor_args>   ⎪
      <rt_accessor>DataSource1_RT_Accessor</rt_accessor>⎪
     - <whereclause>                                   ⎪
         <fieldname>col4</fieldname>                   ⎪
         <dataoperator>eq</dataoperator>               ⎪
         <fieldvalue>c41</fieldvalue>                  ⎬ 420
         <andor>or</andor>                             ⎪
      </whereclause>                                   ⎪
     - <whereclause>                                   ⎪
         <fieldname>col4</fieldname>                   ⎪
         <dataoperator>eq</dataoperator>               ⎪
         <fieldvalue>c42</fieldvalue>                  ⎪
      </whereclause>                                   ⎪
  </datasource>                                        ⎭
  - <datasource>                                       ⎫
      <name>Data Source 102(N)</name>                  ⎪
      <accessor>Accessor 330(N)</accessor>             ⎬ 430
      <accessor_args>datasource2.csv</accessor_args>   ⎪
      <rt_accessor>DataSource2_RT_Accessor</rt_accessor>⎪
  </datasource>                                        ⎭
  - <keys2>                                            ⎫
    - <course from="Data Source102(1)" to="Data Source 102(N)">⎪
       - <path type="both">                            ⎪
         - <direct>                                    ⎪
             <key datasource="Data Source 102(1)" keyname="col1" />⎬ 440
             <key datasource="Data Source 102(N)" keyname="col1" />⎪
         </direct>                                     ⎪
       </path>                                         ⎪
    </course>                                          ⎭
```

FIG. 4B

```
- <course from="Data Source 102(N)" to="Data Source 102(1)">
    - <path type="both">
      - <direct>
          <key datasource="Data Source 102(N)" keyname="col1" />
          <key datasource="Data Source 102(1)" keyname="col1" />
        </direct>
      </path>
    </course>
  </keys2>
```
{ 440

```
- <rule>
    <name>Match Col 2</name>
    <display datasource="Data Source 102(1)" varnames="col2" />
    - <lhs>
        <datasourcename>Data Source 102(1)</datasourcename>
        <varname>col3</varname>
      </lhs>
    <dataoperator>eq</dataoperator>
    - <rhs>
        <datasourcename>Data Source 102(N)</datasourcename>
        <varname>col4</varname>
      </rhs>
  </rule>
```
{ 450

```
<bucket name="YY" codes="11" />   }- 464
<bucket name="YN" codes="10" />   }- 466
<bucket name="NY" codes="01" />   }- 468
```
462 (bracketing "codes")
{ 460

```
- <whitelist>
    <name>Whitelist</name>
    <filename>whitelist1.csv</filename>
    <datasource name="DataSource1" dskey="" wlkey="" />
    <datasource name="DataSource2" dskey="" wlkey="" />
  </whitelist>
</job>
```
{ 470

FIG. 5

SBS Reconciliation :: List of Runs

Valid Runs

| Id | Job Name | Start time | End time | Nb Missing Rec | Nb Inconsistencies | View Details | Invalidate | Delete |
|---|---|---|---|---|---|---|---|---|
| 90 | BnP | 2005-01-12 16:13:30 | 2005-01-12 16:13:39 | 2996 | 0 | Details | ▣ | 🗑 |
| 89 | w2 | 2005-01-11 18:57:25 | 2005-01-11 14:04:50 | 35174 | 0 | Details | ▣ | 🗑 |
| 88 | w2 | 2005-01-06 18:46:58 | 2005-01-06 18:55:54 | 35174 | 0 | Details | ▣ | 🗑 |
| 82 | w2 | 2005-01-06 17:33:50 | 2005-01-06 17:39:58 | 16717 | 0 | Details | ▣ | 🗑 |
| 71 | WSS-Restore | 2004-12-22 17:56:02 | 2004-12-22 17:56:52 | 210 | 0 | Details | | 🗑 |

Completed Runs

| Id | Job Name | Start time | End time | Nb Issues Rec | Nb Inconsistencies | View Details | Certify | Delete |
|---|---|---|---|---|---|---|---|---|
| 80 | w1 | 2005-01-06 17:22:15 | 2005-01-06 17:29:45 | 35335 | 0 | Details | ☑ | 🗑 |
| 77 | BnP | 2005-01-05 11:41:06 | 2005-01-05 11:41:15 | 2996 | 0 | Details | ☑ | 🗑 |

SBS Reconciliation Run Detail

Details of run

| | |
|---|---|
| Job Id | 90 |
| Job Name | BnP |
| Start time | 2005-01-12 16:13:30 |
| End time | 2005-01-12 16:13:39 |
| # of Missing keys | 2996 |
| # of Inconsistencies | 0 |

List of Datasources

| Datasource | | Mode |
|---|---|---|
| ActionedAccounts | 3436 | primary |
| Candidates | 2712 | primary |

Summary of Codes

| Code | Actioned Accounts | Candidates | Problems |
|---|---|---|---|
| 01 | | | 1136 (xml, customizable-csv) |
| 10 | | | 1860 (xml, customizable-csv) |
| 11 | | | 1576 (xml, customizable-csv) |

Summary of Key Buckets

| Bucket | | Contents (Actioned Account Candidates) |
|---|---|---|
| AlreadyActioned | 1576 (xml, customizable-csv) | 11 |
| NewItems | 1136 (xml, customizable-csv) | 01 |
| OldItemsNotAppearingAnyMore | 1860 (xml, customizable-csv) | 10 |

```xml
<?xml version="1.0" encoding="UTF-8" ?>
<fix xmlns:xsi="http://www.w3.org/2001/XMLSchema-instance"
        xsi:noNamespaceSchemaLocation="D:\fix.xsd">
<fixer>
   <class_name>Fixer1</class_name>
   <constructor_args>constructor_args1</constructor_args>
</fixer>
<fixer>
   <class_name>Fixer2</class_name>
   <constructor_args>constructor_args2</constructor_args>
</fixer>
<fixer>
   <class_name>Fixer3</class_name>
   <constructor_args>constructor_args3</constructor_args>
</fixer>
<fixable>
   <code>101</code>
   <callsequence>
   <call>
      <class_name>Fixer2</class_name>
      <method_name>add</method_name>
      <args>args2</args>
      <retries>3</retries>
   </call>
   </callsequence>
</fixable>
```

FIG. 8B

```xml
<fixable>
   <code>010</code>
   <callsequence>
   <call>
      <class_name>Fixer1</class_name>
      <method_name>add</method_name>
      <args>args1</args>
      <retries>1</retries>
      <continueOnFailure>true</continueOnFailure>
   </call>
   <call>
      <class_name>Fixer3</class_name>
      <method_name>add</method_name>
      <args>args3</args>
      <retries>8</retries>
   </call>
   </callsequence>
</fixable>
</fix>
```

CLOSED-LOOP FEEDBACK CONTROL SYSTEM FOR ONLINE SERVICES

FIELD OF THE INVENTION

The present invention relates to a system for resolving inconsistencies between multiple sources of data.

BACKGROUND

Today, companies are providing services ("online services") over a variety of networks, such as the Internet, with increasing frequency. Illustrative examples of an online service include (a) an online service that allows customers to purchase products through a corporate web site, and (b) an online service that allows customers to receive a service, such as insurance or a newspaper subscription, by registering through an electronic interface, such as a user interface displayed on a cell phone.

Online services are typically implemented using a series of one or more computer systems (collectively referred to herein as a "service system") that store and retrieve data from more than one data repository. The data repositories used by such systems may take many forms, such as databases or file servers. There are many reasons why a service system may comprise more than one data repository. One reason is that typically, a service system is composed of multiple sub-systems, and each sub-system may use its own data repository to store data. For example, a service system may have a billing sub-system that stores bill information in one data repository, and a customer management sub-system that that stores customer information in another data repository. Each sub-system of a service system may need to store its own copy of a particular set of data. As a result, multiple copies of the same information may be stored and maintained throughout different sub-systems of a service system.

Another reason why service systems may use more than one data repository is to ensure that a service system implementing an online service can scale to support a large volume of users. By using multiple data repositories, the service system may store certain types of data close to where the data is likely to be requested to minimize the access time to that data. For example, the service system may store a first type of data in a location where the first type of data is used most frequently, while a second type of data may be stored in another location where the second type of data is used most frequently.

Still another reason why service systems may store data in more than one data repository involves how service systems are integrated together. It is common to integrate one computer system (such as a legacy system) into another computer system as the needs of the online service change. Different service systems, prior to integration, may each be comprised of a data repository storing the same or similar type of data, e.g., each service system may have a billing system or have a data repository that stores customer information. When one individual service system is integrated into another service system, the resulting service system may use all of the data repositories previously used by each individual service system prior to integration without combining all of the data repositories into a single data repository. Thus, after integration, the resulting service system may employ multiple data sources that each represent data in different ways, e.g., the resulting service system may now employ a database and a file server or two databases that each store data using dramatically different schemas.

When a service system employing multiple data repositories is deployed in the real world, it is commonplace for inconsistencies to be introduced in the data stored in the multiple data repositories. An inconsistency between two data repositories refers to the condition when the state of data stored in a first data repository does not accurately reflect or is not synchronized with data stored in a different data repository.

To illustrate how such an inconsistency may be introduced into a service system, consider an illustrative service system used by an online service that allows customers to register for cable television service through a web site. The system employs numerous data repositories, including a first data repository that stores billing information and a second data repository that stores service information. Due to an error ("or bug") in the system, after a user registers with the system, data for that user is successfully stored in the first data repository, but not the second data repository. As a result, the system is able to process the bill for the user, so the user will be billed for the service. However, the system will not be able to provide the service to the user, as data stored in the second repository for that user cannot be processed since the data was not stored correctly. As a result of the inconsistency between the user's data between the first data repository and the second data repository, the user will be billed for a service that the user will not receive.

Such inconsistencies between the data repository employed by a system lead to frustration and expense to both the users of the system (for example, due to unsatisfactory quality of service or non-performance of service) and the operators of the system (for example, in lost revenue and the resources allocated by the operators to resolve such inconsistencies).

Currently, operators of a system typically employ IT administrators or specialized technologists (referred to collectively as "the inconsistency resolvers") to manually diagnose inconsistencies between the plurality of data repositories employed by the system. The inconsistency resolvers typically write and execute specialized software programs to identify a particular inconsistency between the plurality of data repositories employed by the system. After an inconsistency resolver verifies the existence of a particular inconsistency using the specialized software programs, the inconsistency resolver typically writes and executes an additional set of specialized software programs to fix the identified inconsistency.

This approach, unfortunately, requires a large amount of time and effort for the inconsistency resolvers to identify and fix an inconsistency. In addition, the inconsistency resolvers need a high degree of technical proficiency to write and execute the specialized software programs required to identify and fix the inconsistencies. Further, the specialized software code used by the inconsistency resolvers only identifies or resolves the particular inconsistencies that the code is configured to correct. As a result, very often the specialized software code only resolves a small portion of the inconsistencies present between the data repositories used by the system. Many unidentified inconsistencies remain unresolved and undetected in the system.

Consequently, an approach for resolving the inconsistencies between multiple data repositories that avoids the disadvantages of the above-mentioned approaches is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 4A and 4B are illustrations of identification data according to an embodiment of the invention;

FIG. 5 is an illustration of a user interface that displays output data at a high-level according to an embodiment of the invention;

FIG. 6 is an illustration of a user interface that displays output data at a more detailed level according to an embodiment of the invention;

FIGS. 8A and 8B are illustrations of rule data according to an embodiment of the invention.

DETAILED DESCRIPTION

Figure 1:
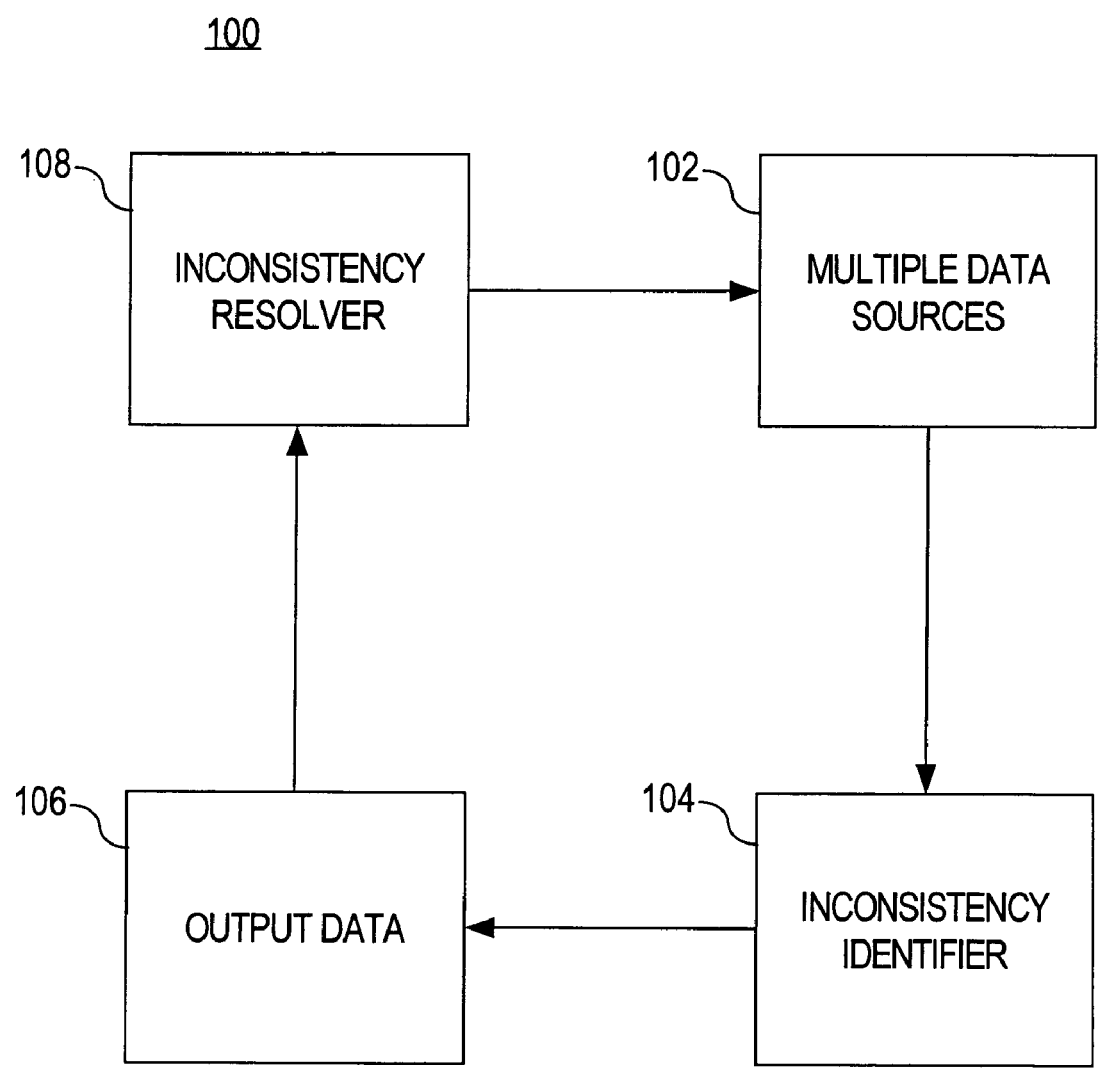
FIG. 1 is a block diagram of the high-level functional components of a system according to an embodiment of the invention.

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Embodiments of the invention are useful in any context where a system has multiple data repositories (or sources of data) that may experience an inconsistency or otherwise become unsynchronized with respect to each other. For example, embodiments of the invention may be useful or well suited towards achieving compliance under the Sarbanes-Oxley Act of 2002. To facilitate the understanding of the reader, embodiments of the invention may be explained herein with reference to a particular context, namely, an online service environment. Embodiments of the invention may be particularly useful to such an environment, as typical online service providers must provide service to its customers 24 hours a day and 7 days a week. Consequently, it is not uncommon for inconsistencies to be introduced into data repositories maintained by an online service. However, the techniques employed by embodiments of the invention are not limited to any particular context or environment.

Functional Overview

Embodiments of the invention advantageously provide a framework for identifying and resolving inconsistencies between multiple data sources. The high-level functional components of a closed-loop feedback control system 100 according to an embodiment of the invention are depicted in the block-diagram of FIG. 1. The closed-loop feedback control system 100 of FIG. 1 comprises multiple data sources 102, an inconsistency identifier 104, output data 106, and an inconsistency resolver 108.

Before an inconsistency that exists between multiple data sources 102 is resolved, the inconsistency must be identified. To that end, the inconsistency identifier 104 stores rules for identifying inconsistencies between the multiple data sources 102. The composition of the rules for identifying inconsistencies between the multiple data sources 102 may vary across various embodiments, as the composition will depend upon the type of data stored in the multiple data sources 102 and what is considered to be an inconsistency. Thus, the rules for identifying inconsistencies between the multiple data sources 102 are configurable to address the needs of a particular implementation and may be arbitrarily complex.

The inconsistency identifier 104 evaluates those rules against the multiple data sources 102. Based on the evaluation, the inconsistency identifier 104 then generates the output data 106 that identifies the inconsistencies between the multiple data sources 102.

The output data 106 has many uses. For example, the output data 106 may be used by an administrator of the closed-loop feedback control system 100 in determining why the inconsistencies between the multiple data sources 102 are present. To allow easy viewing of the output data 106, the output data 106 may be presented or accessed in a variety of ways, e.g., a report may be generated that describes the output data 106 or a user interface may be presented that displays the output data 106 on one or more screens. As explained below, output data 106 may also be used as an input to the inconsistency resolver 108 to assist the inconsistency resolver 108 in resolving the inconsistencies identified in the output data 106.

After the inconsistencies between the multiple data sources 102 are identified in the output data 106, the inconsistency resolver 108 may resolve, as least a portion of, those inconsistencies identified in the output data 106. The inconsistency resolver 108 stores rules for resolving inconsistencies between the multiple data sources 102. Like the rules stored in the inconsistency identifier 104, the composition of the rules for resolving inconsistencies between the multiple data sources 102 (a) will depend upon the type of data stored in the multiple data sources 102 and what is considered to be an inconsistency, and (b) are configurable to address the needs of a particular implementation and may be arbitrarily complex.

The inconsistency resolver 108 accesses the output data 106 that identifies the inconsistencies between the multiple data sources 102. Thereafter, the inconsistency resolver 108 resolves one or more inconsistencies between the multiple data sources 102 in a manner indicated by the rules stored in the inconsistency resolver 108.

The system of FIG. 1 is a closed-loop feedback control system 100, which, in effect, means that output of the inconsistency identifier 104 is the input to the inconsistency resolver 108, and the output of the inconsistency resolver 108 is (directly or indirectly) the input to the inconsistency identifier 104. In this way, the inconsistency identifier 104 and the inconsistency resolver 108 may iterate through many cycles of identifying and resolving inconsistencies that exist between the multiple data sources 102, until all such inconsistencies are resolved (or some other condition is satisfied).

Advantageously, inconsistencies existing between the multiple data sources 102 may be identified and resolved using the closed-loop feedback control system 100. As explained in further detail below, embodiments of the system 100 provide enhanced visibility into the operation of a system whose repositories are being checked. For example, the ability of the operator to diagnose problems leading to inconsistencies existing between the multiple data sources 102 is enhanced by providing the operator with access to the output data 106. Further, the identification and resolution of inconsistencies existing between the multiple data sources 102 may be performed automatically without taking any of the data sources off-line.

Having described the high-level operation of system 100, a more detailed description shall be presented below.

Identifying Inconsistencies Between Multiple Data Sources

Figure 2:
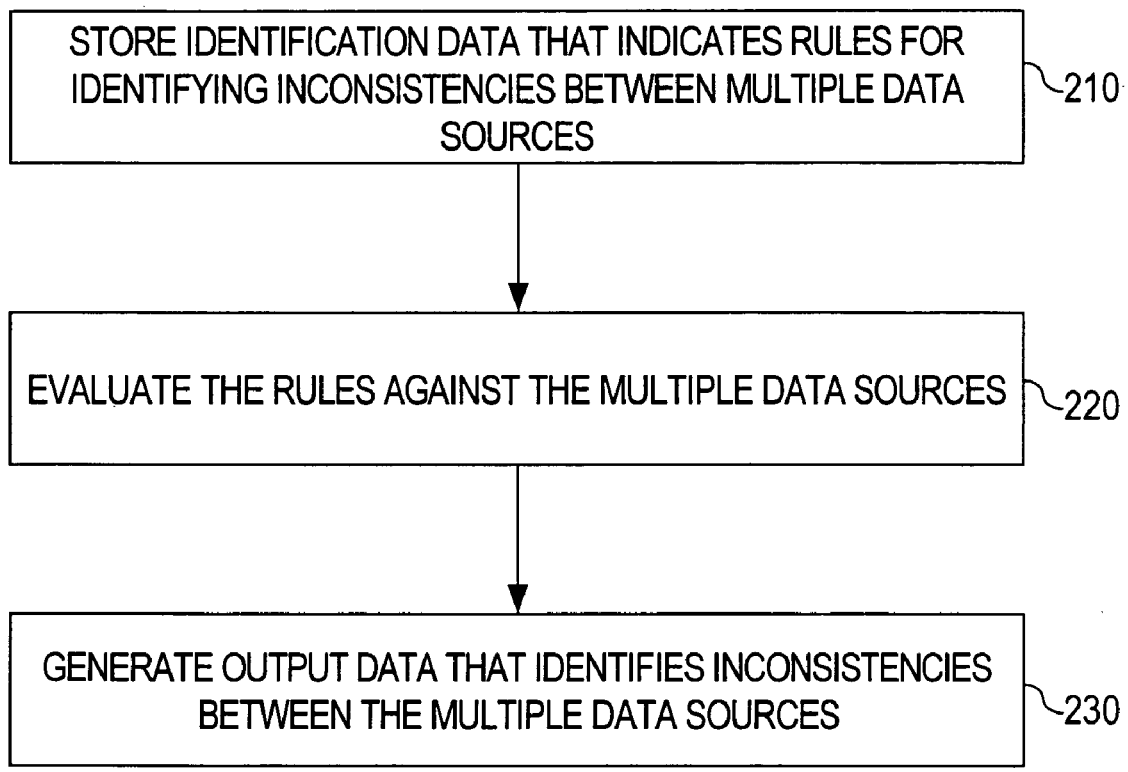
FIG. 2 is a flowchart illustrating the functional steps of identifying one or more inconsistencies that exist between multiple data sources according to an embodiment of the invention.

FIG. 2 is a flowchart illustrating the functional steps of identifying one or more inconsistencies that exist between multiple data sources 102, according to an embodiment of the invention. The below description of the steps of FIG. 2 will make reference to FIG. 3, which is a block-diagram 300 depicting an embodiment of the invention in greater detail than FIG. 1.

Figure 3:
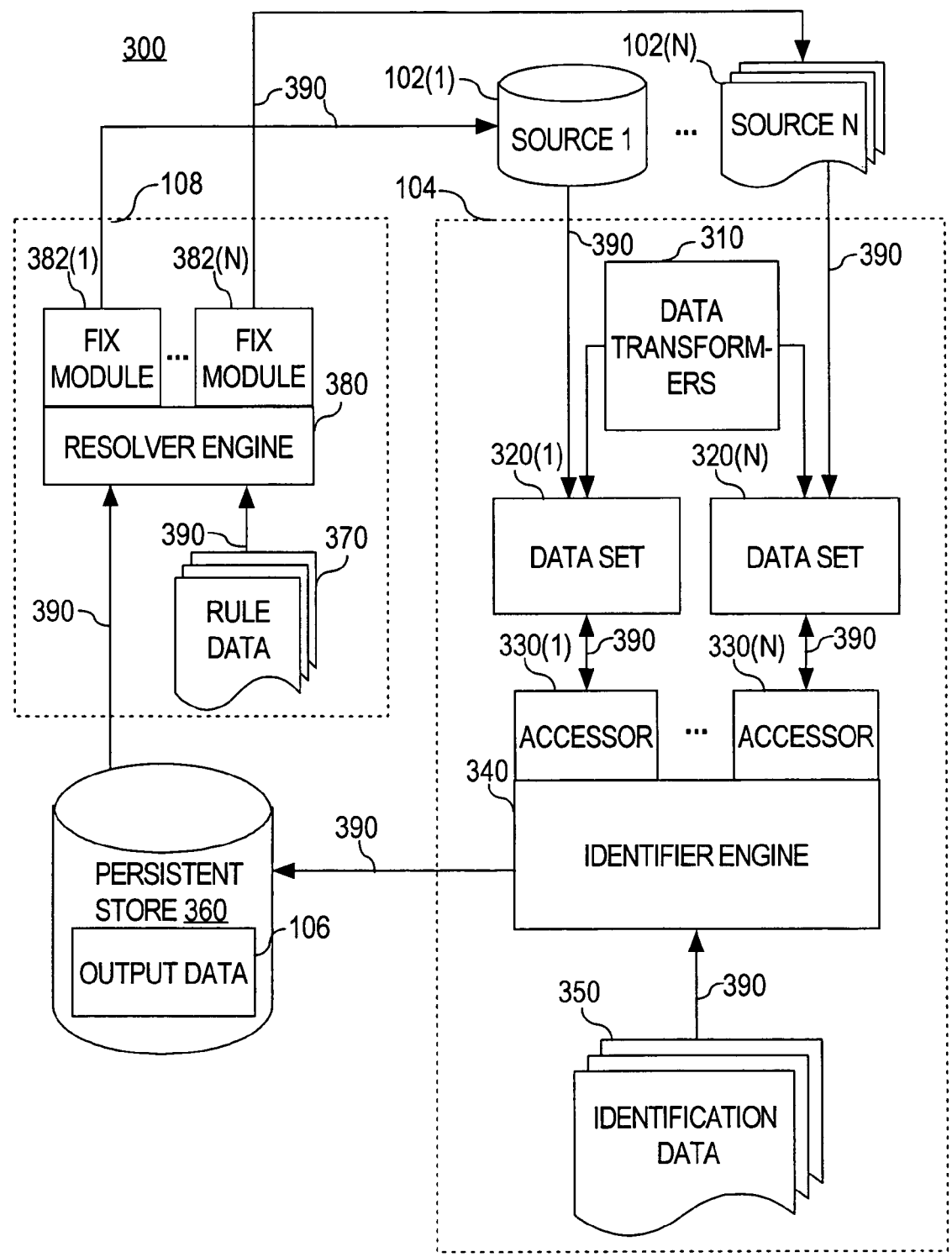
FIG. 3 is a block diagram of a system according to an embodiment of the invention.

As shown in FIG. 3, the inconsistency identifier 104 comprises data transformers 310, one or more data sets 320, one or more accessors 330, an identifier engine 340, and identification data 350. A brief overview of the operation of each component of the inconsistency identifier 104 will be presented before describing the steps of FIG. 2. In an embodiment, the identifier engine 340 instructs one or more accessors 330, based on information contained within the identification data 350, on how to retrieve data from the multiple data sources 102 to form the one or more data sets 320. If necessary, the data transformers 310 may transform a portion of the data in the one or more data sets 320 to ensure that all the data in the one or more data sets 320 is in a queryable format.

The identifier engine 340 then evaluates the rules identified in the identification data 350 against one or more data sets 320 to generate the output data 106 that identifies the inconsistencies between the multiple data sources 102. In the illustrated embodiment, the identifier engine 340 evaluates the rules identified in the identification data 350 against the one or more data sets 320, instead of directly against the multiple data sources 102. Consequently, the performance of those processes implementing the online service that are accessing the multiple data sources 102 are minimally impacted by the operation of the closed-loop feedback control system 100.

Each component of the inconsistency identifier 104 may communicate with other components of the inconsistency identifier 104, one or more of the multiple data sources 102, or the persistent store 360, as shown in FIG. 3, over communications link 390. Communications link 390 may be implemented by any medium or mechanism that provides for the exchange of data between components of closed-loop feedback control system 100. Examples of communications link 390 include, without limitation, a network such as a Local Area Network (LAN), Wide Area Network (WAN), Ethernet or the Internet, or one or more terrestrial, satellite or wireless links.

Each of the components of the inconsistency identifier 104 shall be described in greater detail below in the description of the steps of FIG. 2.

Storing Identification Data

The functional steps of identifying one or more inconsistencies that exist between multiple data sources 102 according to an embodiment of the invention as shown in FIG. 2. Initially, in step 210, identification data 350 that indicates the rules for identifying inconsistencies between the multiple data sources 102 is stored. The purpose of the rules contained within the identification data 350 is to provide the identifier engine 340 with the guidance necessary to determine what constitutes an inconsistency between the multiple data sources 102. The identifier engine 340, described in further detail below, will evaluate the rules, contained within the identification data 350, against the multiple data sources 102 to identify the inconsistencies between the multiple data sources 102.

Identification data 350 may be expressed in a variety of formats, such as being expressed in a document that conforms to the XML protocol ("an XML document"). FIGS. 4A and 4B are illustrations of identification data 350 according to an embodiment of the invention. The identification data 350 depicted in FIGS. 4A and 4B is expressed in an XML document.

In step 210, the identification data 350 may be stored in any medium or mechanism that provides for the reliable storage of data, and which allows the identifier engine 340 to retrieve the identification data 350 as needed. For example, in an embodiment, identification data 350 may be stored in a database, a file server, or in memory in step 210. A user interface may be provided (not depicted in FIG. 3) that allows an administrator of closed-loop feedback control system 100 to configure and store the identification data 350. Having described the operation of step 210, the composition of identification data 350 stored in step 210, according to an embodiment, shall now be discussed.

The Composition of Identification Data

In an embodiment, an administrator may define one or more jobs in the identification data 350. For example, the identification data 350 may contain one or more XML files, and each XML file may define one or more jobs. A job defines a series of one or more tests that may be used to determine whether a type of inconsistency exists in the multiple data sources 102. A job may be defined according to the needs or demands of a business, e.g., one job may check whether an inconsistency exists in the data sources supporting one business need or service, and another job may check whether an inconsistency exists in the data sources supporting another business need or service. For example, a first job may determine whether an inconsistency exists in the data sources used in accounting, and another job may determine whether an inconsistency exists in the data sources used in a particular legacy system used in deploying a particular service to a customer. Thus, the number and nature of the jobs defined in the identification data 350 will depend upon the business logic of the system employing the multiple data sources 102.

When the identifier engine 340 evaluates the rules, contained within the identification data 350, against the multiple data sources 102 to identify the inconsistencies between the multiple data sources 102, the identifier engine 340 may perform a job identified in the identification data 350. As explained in further detail below, each job defined in the identification data 350 may be arbitrarily complex. To better explain how jobs are defined and operate, the illustrative job defined in the identification data 350 depicted in FIGS. 4A and 4B shall now be explained.

FIG. 4A and FIG. 4B depict identification data 350 that comprises a single illustrative job. An administrator may identify information about the job in the header portion 410 of the job. Information identified in the header portion 410 is typically directed towards the general attributes of the job, such as the purpose of the job, its name, and information about the creator of the job. For example, in the header portion 410, an administrator has identified (a) the name of the job (Identification Data Example) using a set of name XML tags (hereafter referred to simply as "tags"), (b) the name of the administrator (John Doe) using the owner tags, and (c) the name of the administrator's email address using the email tags. As would be appreciated by those skilled in the art, additional tags may be used to record additional data in the header portion 410, as well as any portion of a job.

Each job also contains one or more datasource portions, such as datasource portions 420 and 430. The purpose of a datasource portion of a job is to identify those portions of data stored within a particular data source 102 that will be used by tests identified within the job. The identifier engine 340 instructs an accessor 330 to retrieve data from a data source 102 based on information contained within the datasource portion of the job. To more fully illustrate the purpose of the datasource portion, it may be helpful to briefly discuss how the identifier engine 340 evaluates rules identified within the identification data 350.

In an embodiment, when the identifier engine 340 evaluates the rules, identified within the identification data 350, against the multiple data sources 102, the identifier engine 340 may (a) instruct one or more accessors 330 to retrieve one or more data sets 320, from the multiple data sources 102, needed to evaluate the rules, and (b) evaluate the rules against the retrieved one or more data sets 320. An accessor 330 may retrieve a data set 320, from the multiple data sources 102, using information specified in the datasource portions of a job.

By evaluating the rules against the retrieved one or more data sets 320 instead of directly against the multiple data sources 102, advantageously the data in the one or more data sets 320 may be transformed, if necessary, by the data transformers 310 into a queryable format prior to evaluation, thereby aiding the evaluation performed by the identifier engine 340. Also, by evaluating the rules against the retrieved one or more data sets 320, the processing load upon the multiple data sources 102 is minimized, thereby minimizing the impact on the performance of the systems and services that use the multiple data sources 102.

Accordingly, information in the datasource portion of a job describes how to retrieve data, used by tests defined in the job, from the multiple data sources 102. For example, information in the datasource portion of a job may identify (a) a data source of the multiple data sources 102, (b) what data from the identified data source is needed by one or more tests defined in the job, and (c) what data accessor 330 is used to retrieve the identified data from the identified data source.

For example, the identification data 350 of FIG. 4A and FIG. 4B depicts a job having two datasource portions, namely datasource portions 420 and 430. Datasource portion 420 specifies the information needed to be obtained from a particular data source 102(1) to perform tests defined in the job, and datasource portion 430 specifies the information needed to be obtained from data source 102(n) to perform tests defined in the job. A datasource portion may identify (a) the name of the data source (data source 102(1)) using the name tags, (b) the name of the accessor 330 (accessor 330(1)) used to retrieve data from the identified data source 102) using the accessor tags, and (c) what data to retrieve from the identified data source 102 by using the where clause tags to specify one or more conditional statements which, when executed, retrieves the appropriate data from the identified data sources 102. When datasource portion 420 is processed by the identifier engine 340, the identifier engine 340 will instruct accessor 330(1) to retrieve the data identified by the where clauses tags specified in datasource portion 420 from data source 102(1) to form data set 320(1).

Datasource portion 430, while identifying that accessor 330(n) should retrieve data from data source 102(n), does not further specify which data from data source 102(n) should be retrieved. Consequently, when datasource portion 430 is processed by the identifier engine 340, the identifier engine 340 will instruct accessor 330(n) to retrieve all data from data source 102(n) to form data set 320(n).

One or more courses may be defined in a job in a course portion 440 in an embodiment. A course (or data source course) defines a relationship between two data sources 102. In addition, a portion of data may be identified for each data source of the data source course. The purpose of defining a data source course in the course portion 440 of the job is to detect possible inconsistencies between the portions of data identified in the data source course by ensuring that if data records exist for one data source in the defined data source course, then corresponding data records exists on the other data source of the data source course.

For example, assume that the business logic of an online service is such that, anytime a data record is created in data source 102(1), a corresponding data record must be present in the data source 102(n), and vice-versa. Thus, the course portion 440 may be used to identify an inconsistency between data sources 102(1) and 102(n), because if data records exist in data source 102(1), for example, but corresponding data records do not exist in data source 102(n), then an inconsistency between data sources 102(1) and 102(n) is present. Thus, when the identifier engine 340 evaluates the identification data 350, the identifier engine 340 may use the tests identified in the course portion 440 to determine whether corresponding data records exists on all data sources of defined data source course to assist the determination of whether inconsistencies between the multiple data sources 102 are present.

In an embodiment, if an inconsistency is discovered between a set of data sources in a data source course, then other sets of data sources in the data source course will still be evaluated to determine the scope of the inconsistencies. To illustrate, assume that a data source course includes three data sources, namely A, B, and C. If it is discovered that an inconsistency exists between data source A and data source B, then processing will continue to determine whether an inconsistency exists between (1) data sources B and C, and (2) data sources A and C. In this way, the full picture of the scope of the inconsistencies between the multiple data sources 102 may be identified in the output data 106.

In an embodiment, one or more rules may be defined in the rules portion of a job. A rule in the rules portion of a job defines a test to determine whether an inconsistency exists between the various data sources 102 identified in the rule. Rules defined in the rules portion 450 may be arbitrarily complex.

To illustrate how rules in the rules portion operate and may be defined, consider the rules portion 450 in the job of FIGS. 4A and 4B. The name of the rule (Match Col 2) is identified using the name tags. The rule shown in the rules portion 450 tests whether column 3 of data source 102(1) is equal to column 4 of data source 102(n); thus, if column 3 of a table of data source 102(1) is not equal to column 4 of a table of data source 102(n), then an inconsistency exists between data source 102(1) and 102(n). Any rule that may be used to identify an inconsistency between the multiple data sources 102 may be defined in the rules portion 450.

For ease of explanation, the tests identified within the course portion 440 and the rules portion 450 of the job shall be referred to below as the "tests" defined within the job.

In an embodiment, information contained within the result portion of a job instructs the identifier engine 340 on how to record the identified inconsistencies between the multiple data sources 102. The purpose of the result portion of a job is to provide guidance to the identifier engine 340 on how to interpret and report the results of performing the tests defined within a job.

To illustrate how the result portion works, in the result portion 460 of the job illustrated in FIGS. 4A and 4B, the result portion 460 instructs the identifier engine how to report or categorize any inconsistencies identified between the data source 102(1) and the data source 102(n). The result portion 460 comprises the three possible outcomes after performing the tests of the job, namely: (a) data source 102(1) passes the tests and data source 102(n) passes the tests, which corresponds to line 464, (b) data source 102(1) passes the tests, but data source 102(n) does not pass the tests, which corresponds to line 466, and (c) data source 102(1) does not pass the tests, but data source 102(n) does pass the tests, which corresponds to line 468.

Each line of the result portion 460 has a codes value 462, and the codes value 462 comprises a series of bits. The first bit of the codes value 462 corresponds to the first data source identified in a data source portion of the job, the second bit of the codes value 462 corresponds to the second data source identified in a data source portion of the job, and so on. If a bit in the codes value 462 is a 1, then that indicates that the data source associated with that bit passed all the tests defined in the job, and if a bit in the codes value 462 is a 0, then that indicates the data source associated with that bit did not pass all the tests defined in the job.

Thus, when the identifier engine 340 evaluates the job illustrated in FIGS. 4A and 4B, after performing the tests defined in the job on data sets 320(1) and 320(n), the identifier engine 340 will (a) report the results of those tests in which data source 102(1) and data source 102(n) both passed in category "YY," (b) report the results of those tests in which data source 102(1) passes and data source 102(n) does not pass in category "YN," and (c) report the results of those tests in which data source 102(1) does not pass and data source 102(n) passed in category "NY." The above approach for instructing the identifier engine 340 on how to report the results of performing test identified in a job is merely illustrative of one approach that may be used, as those skilled in the art shall appreciate a number of methods may be employed.

In an embodiment, one or more whitelists may be contained within a whitelist portion 470 of the job. A whitelist includes one or more entries, and each entry of the whitelist identifies a portion of data stored in a data source 102 where inconsistencies between the multiple data sources 102 are not identified. Thus, the purpose of the whitelist portion 470 is to exclude the portions of data identified in a whitelist from evaluation by the inconsistency identifier 104. For example, if an administrator of system is performing development or testing on a certain portion of the system, and the administrator is aware that this portion may contain inconsistencies with respect to other data sources 102, then it would be advantageous to identify those portions of the system under development or testing in the whitelist portion 470 so that the output data 106 identifies only those inconsistencies between the multiple data sources 102 that present a real problem or are unknown to the administrator of system 100.

After the identification data 350 that indicates rules for identifying inconsistencies between the multiple data sources 102 is stored, processing proceeds to step 220.

Identifying Inconsistencies in the Plurality of Data Sources

In step 220, the identifier engine 340 evaluates the rules contained within the identification data 350 against the one or more data sets 320 to identify inconsistencies between the multiple data sources 102. The identifier engine 140 may be implemented by any medium or mechanism that provides for evaluating the rules contained within the identification data 350 against the multiple data sources 102 to identify inconsistencies between the multiple data sources 102. For example, the identifier engine 140 may be implemented as software executing on a computer.

In an embodiment, an administrator of the closed-loop feedback control system 100 may configure the identifier engine 340 to process one or more jobs identified in the identification data 350 on command, at periodic intervals, or at specified times. For example, one job defined in the identification data 350 may be processed by the identifier engine 340 every four hours, and another job defined in the identification data 350 may be processed by the identifier engine 340 at 2:00 AM EST every other Friday. An administrator may also arrange one or more jobs defined in the identification data 350 to be processed by the identifier engine 340 in a batch.

To illustrate how the identifier engine 340 evaluates the rules contained within the identification data 350, the process of the identifier engine 340 evaluating the rules contained within the identification data 350 illustrated in FIGS. 4A and 4B will now be described. After the identifier engine 340 determines that a particular job should be processed (for example, the identifier engine 340 may be instructed by an administrator to process a particular job or the particular job may be scheduled to be processed), the identifier engine 340 reads all data source portions contained in the job to determine what data sources store data being evaluated by rules defined in the job. After reading all the data source portions of the job, the identifier engine 340 instructs one or more accessors 330 to retrieve the data identified in all the data source portions of the job based on information contained within the data source portions to form the one or more data sets 320. For example, the identifier engine 340 may read data source portion 420, and thereafter instruct accessor 330(1) to retrieve data from data source 102(1) using the configuration specified in data source portion 420 to form data set 320(1).

After the one or more accessors 330 retrieve the data from the multiple data sources 102, the retrieved data may not be in a form that is in a queryable format. Thus, if necessary, data transformers 310 may transform a portion of the retrieved data in one or more data sets 320 to ensure that all the retrieved data is in a queryable format. If transformation of the data is not necessary, then data transformers 310 do not perform any action on the one or more data sets 320.

Data transformer 310 may be implemented by any medium or mechanism that provides for converting the data from one format to another. While data transformers 310 is depicted as a single entity in FIG. 3, in other embodiments of the invention (not depicted), each of the multiple data sources 102 may be associated with a different data transformer 310. In other embodiments of the invention (not depicted), data transformer 310 need not be included in system 100. For example, if, in a particular implementation, the format of data used to store data in each of the multiple data sources 102 always facilitates the execution of database queries, then the data transformer 310 need not be included in the implementation. Thus, embodiments of the invention may not include data transformers 310.

After the one or more data sets 320 are formed, the identifier engine evaluates the tests identified in the course portion and the rules portion of the job against the one or more data sets 320. Any data that is identified in the whitelist portion 470 of the job is not evaluated by the identifier engine 340. After the identifier engine evaluates the tests identified in the course portion and the rules portion of the job against the one or more data sets 320, the results of performing the evaluation are interpreted and recorded according to the information in the result portion 460.

After the inconsistencies between the multiple data sources 102 are identified, processing proceeds to step 230.

Generating, Storing, and Using the Output Data

In step 230, the identifier engine 340 generates the output data 106 that identifies inconsistencies between the plurality of data sources 102. The output data 106 describes all the inconsistencies between the plurality of data sources 102 that were identified in step 220 as a result of evaluating the ruled defined in the identification data 150.

In one embodiment, once the identifier engine 340 generates the output data 106, the output data 106 may be stored in persistent store 360 as shown in FIG. 3. Persistent store 360 may be implemented by any medium or mechanism that facilitates the durable storage of data, such as a database. For example, once the output data 106 is generated, it may be stored in one or more tables of a database or recorded in one or more files of a file server. In another embodiment, once the identifier engine 340 generates the output data 106, the output data 106 may be stored in memory (not shown).

Once the output data 106 is generated, it may be communicated to a user in a variety of formats. In an embodiment, a user interface may be presented to a user, such as an administrator, that displays, at least a portion of, the output data 106. Output data 106 may be shown on a user interface at different levels of granularity. For example, FIG. 5 is an illustration of a user interface 500 that displays output data at a high-level according to an embodiment. User interface 500 shows information about all the jobs that have recently run, such as the job name, the start time, the end time, and information about the inconsistencies identified by the job. User interface 500 also allows a viewer to delete and invalidate portions of the output data 106. User interface 500 is merely illustrative, as output data 106 may be displayed in a variety of ways and formats.

A user may also drill down on information shown on user interface 500 to view more detailed information. If a user clicks a link on display 500 associated with the job entitled BnP, such as link 502, another user interface may be displayed that shows more detailed information about that job, such as user interface 600 shown in FIG. 6. User interface 600 shows additional details about a particular job. Any number of user interfaces may be used to show output data 106 at any level of granularity.

In an embodiment, one or more reports may be generated based on the output data generated in step 230. The one or more reports may be generated automatically or upon command, and each report may show a portion of the output data 106. For example, a first report may describe the output data 106 at a high-level, and other reports may describe the output data 106 at lower levels of granularity. A report may be transmitted to a user after it is generated, or it may be persistently stored, e.g., a report may be stored in persistent store 360.

A user may use a report or user interface showing the output data 106 to gain enhanced visibility into the operation of a computerized system employing an embodiment of the invention. For example, problems leading to inconsistencies existing between the multiple data sources 102 may be diagnosed by viewing the output data 106, such as in a report or on a user interface.

In addition, in an embodiment, the closed-loop feedback control system 100 may be configured to generate an alert that is triggered based on whether certain conditions in the output data 106 are satisfied. For example, if the output data 106 indicates a severe inconsistency, then an administrator may automatically receive a page or an email.

Significantly, the output data 106 generated in step 230 may be used as an input to the inconsistency resolver 108. In this way, the output data 106 may be used to resolve the inconsistencies identified therein. The operation of the inconsistency resolver 108 shall now be discussed in greater detail.

The Inconsistency Resolver

Figure 7:
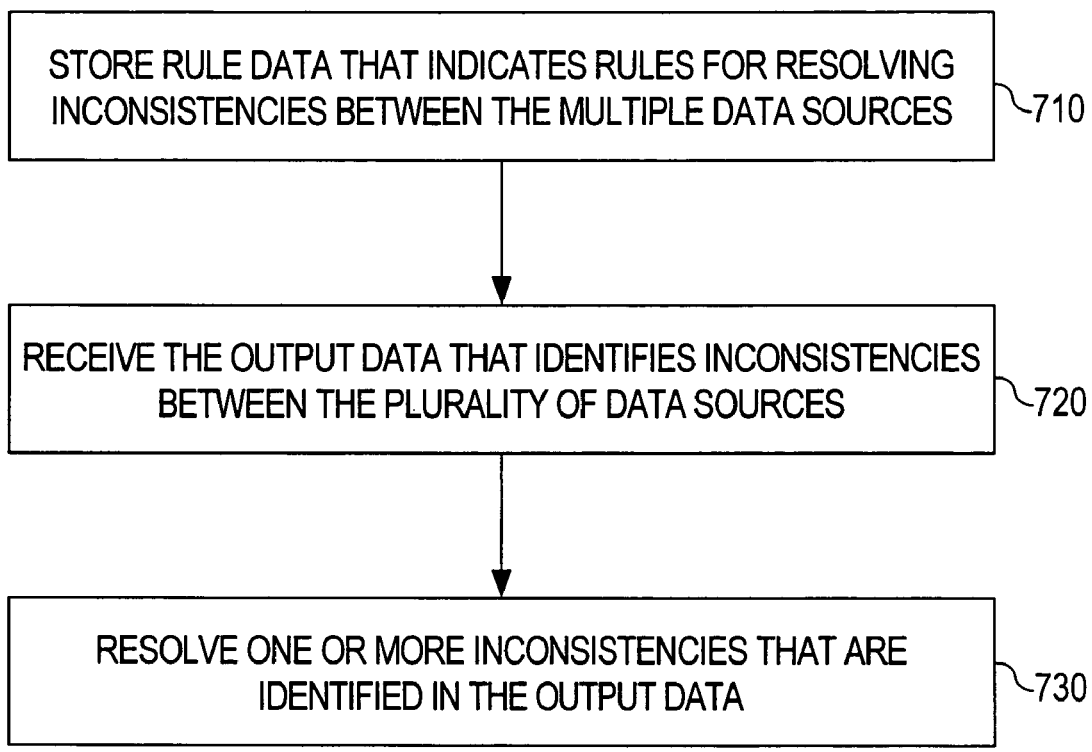
FIG. 7 is a flowchart illustrating the functional steps of resolving one or more inconsistencies that exist between multiple data sources according to an embodiment of the invention.

FIG. 7 is a flowchart illustrating the functional steps of resolving one or more inconsistencies that exist between multiple data sources 102 performed by an embodiment of the invention. The below description of the steps of FIG. 7 will make reference to FIG. 3, which is a block-diagram depicting an embodiment of the invention in greater detail than FIG. 1.

As shown in FIG. 3, the inconsistency resolver 108 comprises rule data 370, a resolver engine 380, and one or more fix modules 382. Rule data 370 that indicates rules for resolving inconsistencies between the multiple data sources 102 is stored. The resolver engine 380 reads the output data 106 generated by the identifier engine 340. The resolver engine 380 then uses the rule data 370 and the output data 106 to resolve one or more inconsistencies of the multiple data sources 102 that are identified in the output data 106. The resolver engine 380, in resolving the one or more inconsistencies, may communicate with one or more fix modules to instruct the one or more fix modules to perform one or more actions on a data source to resolve an identified inconsistency between the multiple data sources 102.

Each component of the inconsistency resolver 108 may communicate with the other components of the inconsistency resolver 108, one or more of the multiple data sources 102, or the persistent store 360, as shown in FIG. 3, over communications link 390.

Having described the high-level operation of the inconsistency resolver 108, the functional steps of FIG. 7 shall be described below in greater detail.

The Storing and Composition of Rule Data

In step 710, rule data 370 that indicates the rules for resolving inconsistencies between the multiple data sources 102 is stored. The purpose of the rule data 370 is to capture all the information necessary to instruct the resolver engine 380 on how the resolver engine 380 should resolve any inconsistency identified in the output data 360. The composition of the rule data 370 may vary from implementation to implementation, as the composition will reflect the business logic used in resolving those inconsistencies identified in the output data 106. The composition of the rule data 370 will depend upon the type of data stored in the multiple data sources 102 and how inconsistencies between the multiple data sources 102 are to be resolved. The rules indicated in the rule data 370 are configurable to address the needs of a particular implementation and may be arbitrarily complex.

Rule data 370 may be expressed in a variety of formats, such as being expressed in an XML document. FIGS. 8A and 8B are illustrations of rule data 370 according to an embodiment of the invention. The rule data 370 depicted in FIGS. 8A and 8B is expressed in an XML document.

In step 710, the rule data 370 may be stored in any medium or mechanism for that provides for durably storing data, and which allows the resolver engine 380 to retrieve the rule data 370 as needed. For example, in an embodiment, rule data 370 may be stored in a database, a file server, or in memory in step 210. A user interface may be provided (not depicted in FIG. 3) that allows an administrator of closed-loop feedback control system 100 to configure and store the rule data 370. After the execution of step 710, processing proceeds to step 720.

In step 720, the output data 106 that identifies inconsistencies between the multiple data sources 102 is received by the resolver engine 380. Prior to the execution of step 720, the inconsistency identifier 104 has generated the output data 106, as explained above with reference to FIG. 2. Once the resolver engine 380 reads the output data 106, the resolver engine 380 is informed of all the identified inconsistencies between the multiple data sources 102. Step 720 may be performed, in an embodiment, by resolve engine 380 accessing the persistent store 360 to obtain the output data 106. After the resolver engine 380 receives the output data 106, processing proceeds to step 730.

Resolving Identified Inconsistencies Between the Multiple Data Sources

In step 730, one or more inconsistencies that are identified in the output data 106 are resolved. In an embodiment, the resolver engine 380 applies the rules indicated in the rule data 370 to each inconsistency identified in the output data 370. In resolving a particular inconsistency, the rules indicated in the rule data 370 cause the resolver engine 380 to instruct a particular fix module of the set of fix modules 382 to correct the particular inconsistency in the multiple data sources 102 by contacting one or more data sources of the multiple data sources 102 to effect a change that resolves the inconsistency. If a particular fix module, of the set of fix modules 382, indicates to the resolver engine 380 that the particular fix module was unable to resolve an inconsistency in the first attempt, the resolver engine 380 may be configured to instruct the set of fix modules 382 to correct the identified inconsistency in the second attempt, e.g., by attempting a different fix in the multiple data sources 102 or attempting to resolve the inconsistency at a later point in time.

Fix modules 382, such as fix modules 382(1) and 382(n), may be implemented by any medium or mechanism that provides for correcting inconsistencies within one or more data sources of multiple data sources 102.

As the fix modules 382 are designed to implement the business logic needed to resolve the identified inconsistencies between the multiple data sources 102, the actions performed by the fix modules 382 will depend upon the needs and nature of the business implementing the closed-loop feedback control system 100. In an embodiment, a fix module 382 may be configured to fix a particular type of inconsistency in one or more data sources of multiple data sources 102. In another embodiment, a fix module 382 may be configured to fix a set of inconsistencies in a single data source of multiple data sources 102.

Advantageously, if the business logic for resolving an inconsistency between the multiple data sources 102 changes, then the only change that needs to be effected in the closed-loop feedback control system 100 is to update one or more of the fix modules 382 and possibly the rule data 370 to reflect the changed business logic. Similarly, if the business logic for identifying an inconsistency between the multiple data sources 102 changes, then the only change that needs to be effected in the closed-loop feedback control system 100 is to update the identification data 350 to reflect the changed business logic. In this way, the closed-loop feedback control system 100 provides a modular framework for identifying and resolving inconsistencies between the multiple data sources 102.

Real Time Checks to Verify Identified Inconsistencies

In the operation of an online service, data may be recorded in different data sources of the multiple data sources 102 at different times. For example, according to a business procedure, a customer may, in sequence, (a) register with the system by storing data in a first data source, (b) configure a set of service options by storing data in a second data source, (c) record payment information in a third data source, and (d) initiate the service by storing data in a fourth data source. Thus, the mere fact that, at one point in time, a set of data is stored in a first data source, but a corresponding set of data is not present in a second data source, is not dispositive of the determination of whether an actual inconsistency is present between the data sources, as the corresponding set of data may subsequently be recorded in the second data source.

It is possible that an inconsistency identified in the output data 106 may be resolved in the natural course of a business process once additional data is recorded into other data sources of the multiple data sources 102. Consequently, in an embodiment, after the identifier engine 340 generates a set of output data 106, the identifier engine 340 may "double-check" the data sources 102 to determine that the set of inconsistencies identified in the output data 106 are actual inconsistencies between the data sources 102, instead of being the result of a normal business process recording data in different data sources at different points in time. Rules may be defined within the identification data 350 to instruct the identifier engine 340 to verify whether an inconsistency identified in the output data 106 is an actual inconsistency by either (a) dynamically checking data stored within the multiple data sources 102, or (b) instructing an accessor 330 to retrieve a new data set 320 so that the new data set 320 may be checked.

Implementing Mechanisms

Figure 9:
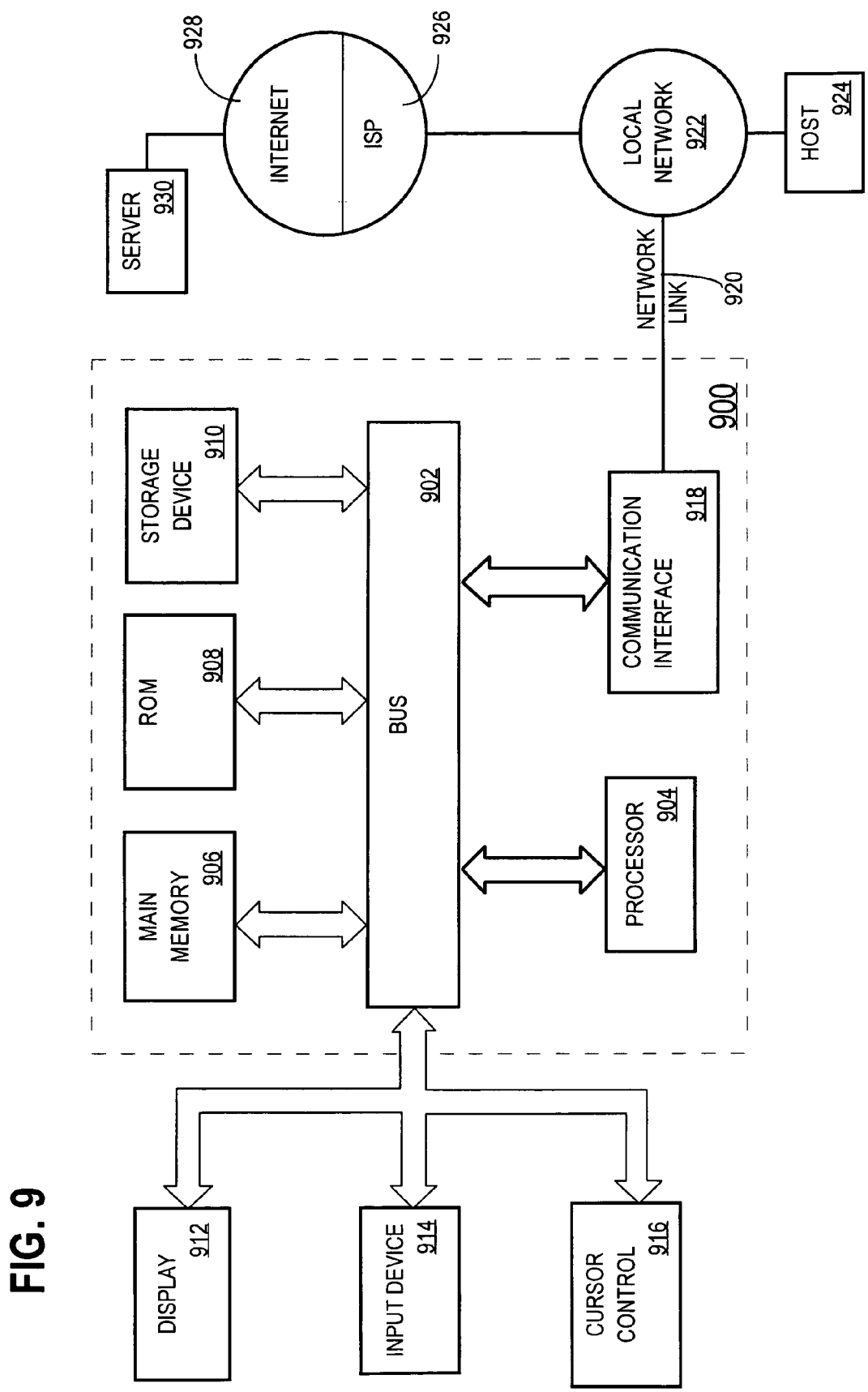
FIG. 9 is a block diagram that illustrates a computer system upon which an embodiment of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor

904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:
   storing identification data that defines consistency rules that were specified by one or more users for identifying inconsistencies between a plurality of data sources that includes a first repository of data and a second repository of data;

wherein the consistency rules include at least:
a first consistency rule that specifies (1) a first location of a first set of values in the first repository of data and a second location of a second set of values in the second repository of data; and (2) a first relationship between the first set of values and the second set of values;
a second consistency rule that specifies (1) a third location of a third set of values in the first repository of data and a fourth location of a fourth set of values in the second repository of data; and (2) a second relationship, different from the first relationship, between the third set of values and the fourth set of values;
executing, in a first phase, a first sequence of instructions that cause one or more processors to perform the steps of:
(a) reading, from a file separate from the first sequence of instructions, said identification data;
(b) while the first sequence of instructions is executing, dynamically determining the consistency rules based on the identification data read from the file separate from the first sequence of instructions;
(c) evaluating the consistency rules against the plurality of data sources by comparing values in the first repository of data to related values in the second repository of data based on the consistency rules;
(d) during the evaluation of the consistency rules, determining at least one inconsistency between the values in the first repository of data and the related values in the second repository of data, based at least on one of the first relationship or the second relationship, as specified in said consistency rules; and
(e) based on the evaluation of the consistency rules, generating output data that identifies the at least one inconsistency;
storing resolution data, different from the identification data, that defines resolution rules that were specified by the one or more users for resolving one or more inconsistencies between the plurality of data sources;
wherein the resolution rules include at least a particular resolution rule that specifies a specific manner in which to resolve a particular inconsistency between the first repository of data and the second repository of data by modifying data in at least one of the first repository of data and the second repository of data; and
executing, in a second phase, subsequent to the first phase, a second sequence of instructions that cause performance of the steps of:
(f) accessing the output data;
(g) identifying the at least one inconsistency based on the accessed output data;
(h) reading, from a file separate from the second sequence of instructions, said resolution data;
(i) while the second sequence of instructions is executing, dynamically determining the resolution rules based on the resolution data read from the file separate from the second sequence of instructions; and
(j) based on the determined resolution rules, modifying data in at least one of the first repository of data and the second repository of data in the specific manner indicated by the particular resolution rule to resolve the at least one inconsistency.

2. The method of claim 1, wherein executing the first sequence of instructions further causes performance of the steps of:
storing the output data in a persistent store; and
presenting a user interface that displays at least a portion of the output data stored in the persistent store.

3. The method of claim 1:
wherein evaluating the consistency rules against the plurality of data sources comprises:
identifying a whitelist referenced in the identification data;
determining a fifth set of values, stored in the plurality of data sources, that corresponds to the whitelist; and
excluding said fifth set of values from consideration when evaluating the rules against the plurality of data sources.

4. The method of claim 1, wherein the step of evaluating the consistency rules against the plurality of data sources comprises the step of:
determining, based on the consistency rules represented in the identification data, a subset of data stored in the plurality of data sources to be evaluated;
retrieving said subset of data from the plurality of data sources; and
after retrieving said subset of data from the plurality of data sources, transforming at least a portion of the subset of data into a queryable format.

5. The method of claim 1, wherein:
the consistency rules identify a plurality of tests,
each test of the plurality of tests is used to determine whether a type of inconsistency exists in the plurality of data sources, and
wherein each test, of the plurality of tests, identifies one or more sets of conditions that must be satisfied by one or more data sources of the plurality of data sources in order for the plurality of data sources to not contain the type of inconsistency associated with the test.

6. The method of claim 5, wherein the step of evaluating the consistency rules against the plurality of data sources comprises:
performing a first test of the plurality of tests by:
identifying a first condition of the one or more sets of conditions associated with the first test;
upon determining that the first condition is not satisfied by at least one data source of the plurality of data sources, identifying a second condition of the one or more sets of conditions associated with the first test; and
determining whether the second condition is satisfied by the plurality of data sources.

7. The method of claim 1, wherein the step of evaluating the consistency rules against the plurality of data sources comprises the step of:
determining, at a first point in time, a first set of inconsistencies between the plurality of data sources; and
determining, at a second point in time occurring after the first point in time, a second set of inconsistencies in the first set of inconsistencies, wherein the inconsistencies in the second set of inconsistencies are those inconsistencies of the first set of inconsistencies that have not been resolved.

8. The method of claim 1, wherein the identification data is stored in one or more XML documents.

9. The method of claim 1, further comprising executing a third sequence of instructions that cause one or more processors to perform the steps of:
(j) in response to completing step (i), automatically repeating steps (a) through (i) at least once;
(k) evaluating the consistency rules against the plurality of data sources a final time;
wherein the step of evaluating the consistency rules against the plurality of data sources a final time comprises determining that there are no inconsistencies between the plurality of data sources.

10. The method of claim 1, wherein executing the first sequence of instructions further causes performance of the step of:
prior to step (a), storing data in a particular data source of the plurality of data source;
wherein step (a) is initiated in response to the step of storing data in a particular data source.

11. The method of claim 1, wherein each data source in the plurality of data sources is one of a database, a database portion, a file server, or a group of one or more files stored in a persistent storage device.

12. The method of claim 1, wherein the file separate from the first sequence of instructions is also the file separate from the second sequence of instructions, the file having stored therein the identification data and the resolution data.

13. A machine-implemented method, comprising the steps of:
storing resolution data that defines resolution rules that were specified by a user for resolving one or more inconsistencies between a plurality of data sources;
wherein the resolution rules include a particular resolution rule for modifying data in at least one of a first repository of data and a second repository of data to resolve an inconsistency between values in the first repository of data and related values in the second repository of data; and
executing a sequence of instructions that cause one or more processors to perform the steps of:
accessing output data, separate from the plurality of data sources, that identifies at least one inconsistency between the plurality of data sources;
identifying the at least one inconsistency based on the accessed output data;
reading said resolution data from a file separate from the sequence of instructions;
while the sequence of instructions is executing, dynamically determining the resolution rules based on the resolution data read from the file separate from the sequence of instructions; and
modifying data in the plurality of data sources in a manner indicated by the particular resolution rule to resolve the at least one inconsistency.

14. The method of claim 13, wherein the step of resolving the at least one inconsistency comprises:
determining, based on the resolution rules, a set of one or more modules responsible for resolving the at least one inconsistency; and
instructing the set of one or more modules to resolve the at least one inconsistency.

15. The method of claim 14, wherein each of the set of one or more modules is configured to operate upon data stored in only one of the plurality of data sources.

16. The method of claim 14, wherein each of the set of one or more modules is configured to resolve a particular type of inconsistency identified in the plurality of data sources.

17. The method of claim 13, wherein the resolution rules are expressed in one or more XML documents.

18. The method of claim 13, wherein the resolution rules include a second particular resolution rule, different from the particular resolution rule, for modifying data in at least one of the first repository of data and the second repository of data to resolve an inconsistency between second values in the first repository of data and second related values in the second repository of data.

19. A machine-implemented method, comprising the steps of:
storing identification data that defines consistency rules that were specified by one or more users for identifying inconsistencies between a plurality of data sources that includes a first repository of data and a second repository of data;
evaluating the consistency rules against the plurality of data sources, said evaluating comprising:
in a first phase of steps performed at a first point in time:
(1) determining, at a first point in time, a first set of inconsistencies between values in the first repository of data and related values in the second repository of data;
(2) prior to attempting to resolve the first set of inconsistencies, determining, at a second point in time occurring after the first point in time, a second set of inconsistencies in the first set of inconsistencies, wherein the inconsistencies of the second set of inconsistencies are those inconsistencies of the first set of inconsistencies that have not been resolved between the first point in time and the second point of time;
(3) generating output data that identifies the second set of one or more inconsistencies; and
(4) storing said output data in a persistent store;
in a second phase of steps performed subsequent to the first phase of steps;
(5) accessing said output data in said persistent store to identify the second set of one or more inconsistencies; and
(6) in response to identifying the second set of inconsistencies, resolving the second set of inconsistencies;
wherein the method is performed by one or more processors.

20. A machine-implemented method, comprising the steps of:
in a first phase of steps:
(1) identifying one or more inconsistencies between a plurality of data sources by comparing a first set of values in a first data source to a second set of values in a second data source;
(2) generating output data that identifies the one or more inconsistencies; and
(3) storing said output data in a persistent store;
in a second phase of steps performed subsequent to the first phase of steps:
(4) accessing said output data in said persistent store to determine the one or more inconsistencies;
(5) modifying data in said plurality of data sources to resolve said one or more inconsistencies;
wherein upon completion of step (5) after a first performance of the second phase, additional inconsistencies remain between the plurality of data sources; and
after a first iteration of steps (1)-(5), repeating the first phase and the second phase one or more times with respect to the plurality of data sources, until there are no inconsistencies between the plurality of data sources;
wherein the method is performed by one or more processors.

21. A machine-readable storage medium storing instructions which, when executed by one or more processors, causes the one or more processors to perform:
storing identification data that defines consistency rules that were specified by one or more users for identifying inconsistencies between a plurality of data sources that includes a first repository of data and a second repository of data;

wherein the consistency rules include at least:
- a first consistency rule that specifies (1) a first location of a first set of values in the first repository of data and a second location of a second set of values in the second repository of data; and (2) a first relationship between the first set of values and the second set of values;
- a second consistency rule that specifies (1) a third location of a third set of values in the first repository of data and a fourth location of a fourth set of values in the second repository of data; and (2) a second relationship, different from the first relationship, between the third set of values and the fourth set of values;

executing, in a first phase, a first sequence of instructions that cause a first set of the one or more processors to perform steps of:
(a) reading, from a file separate from the first sequence of instructions, said identification data;
(b) while the first sequence of instructions is executing, dynamically determining the consistency rules based on the identification data read from the file separate from the first sequence of instructions;
(c) evaluating the consistency rules against the plurality of data sources by comparing values in the first repository of data to related values in the second repository of data based on the consistency rules;
(d) during the evaluation of the consistency rules, determining at least one inconsistency between the values in the first repository of data and the related values in the second repository of data, based at least on one of the first relationship or the second relationship, as specified in said consistency rules; and
(e) based on the evaluation of the consistency rules, generating output data that identifies the at least one inconsistency;

storing resolution data, different from the identification data, that defines resolution rules that were specified by the one or more users for resolving one or more inconsistencies between the plurality of data sources;

wherein the resolution rules include at least a particular resolution rule that specifies a specific manner in which to resolve a particular inconsistency between the first repository of data and the second repository of data by modifying data in at least one of the first repository of data and the second repository of data; and executing, in a second phase, subsequent to the first phase, a second sequence of instructions that cause a second set of the one or more processors to perform the steps of:
(f) accessing the output data;
(g) identifying the at least one inconsistency based on the accessed output data;
(h) reading, from a file separate from the second sequence of instructions, said resolution data;
(i) while the second sequence of instructions is executing, dynamically determining the resolution rules based on the resolution data read from the file separate from the second sequence of instructions; and
(j) based on the determined resolution rules, modifying data in at least one of the first repository of data and the second repository of data in the specific manner indicated by the particular resolution rule to resolve the at least one inconsistency.

22. The machine-readable storage medium of claim 21, wherein executing the first sequence of instructions further causes performance of the steps of:

storing the output data in a persistent store; and
presenting a user interface that displays at least a portion of the output data stored in the persistent store.

23. The machine-readable storage medium of claim 21, wherein evaluating the consistency rules against the plurality of data sources comprises:
identifying a whitelist referenced in the identification data;
determining a fifth set of values, stored in the plurality of data sources, that corresponds to the whitelist; and
excluding said fifth set of values from consideration when evaluating the rules against the plurality of data sources.

24. The machine-readable storage medium of claim 21, wherein evaluating the consistency rules against the plurality of data sources comprises:
determining, based on the consistency rules represented in the identification data, a subset of data stored in the plurality of data sources to be evaluated;
retrieving said subset of data from the plurality of data sources; and
after retrieving said subset of data from the plurality of data sources, transforming at least a portion of the subset of data into a queryable format.

25. The machine-readable storage medium of claim 21, wherein:
the consistency rules identify a plurality of tests,
each test, of the plurality of tests, is used to determine whether a type of inconsistency exists in the plurality of data sources, and
wherein each test, of the plurality of tests, identifies one or more sets of conditions that must be satisfied by one or more data sources of the plurality of data sources in order for the plurality of data sources to not contain the type of inconsistency associated with the test.

26. The machine-readable storage medium of claim 25, wherein evaluating the consistency rules against the plurality of data sources comprises performing a first test of the plurality of tests by:
identifying a first condition of the one or more sets of conditions associated with the first test;
upon determining that the first condition is not satisfied by at least one data source of the plurality of data sources, identifying a second condition of the one or more sets of conditions associated with the first test; and
determining whether the second condition is satisfied by the plurality of data sources.

27. The machine-readable storage medium of claim 21, wherein evaluating the consistency rules against the plurality of data sources comprises:
determining, at a first point in time, a first set of inconsistencies between the plurality of data sources; and
determining, at a second point in time occurring after the first point in time, a second set of inconsistencies in the first set of inconsistencies, wherein the inconsistencies in the second set of inconsistencies are those inconsistencies of the first set of inconsistencies that have not been resolved.

28. The machine-readable storage medium of claim 21, wherein the identification data is stored in one or more XML documents.

29. A machine-readable storage medium carrying one or more sequences of instructions which, when executed by one or more processors, causes the one or more processors to perform the method recited in claim 13.

30. A machine-readable storage medium carrying one or more sequences of instructions which, when executed by one or more processors, causes the one or more processors to perform the method recited in claim 14.

31. A machine-readable storage medium carrying one or more sequences of instructions which, when executed by one or more processors, causes the one or more processors to perform the method recited in claim 15.

32. A machine-readable storage medium carrying one or more sequences of instructions which, when executed by one or more processors, causes the one or more processors to perform the method recited in claim 16.

33. A machine-readable storage medium carrying one or more sequences of instructions which, when executed by one or more processors, causes the one or more processors to perform the method recited in claim 17.

34. A machine-readable storage medium carrying one or more sequences of instructions which, when executed by one or more processors, causes the one or more processors to perform the method recited in claim 9.

35. A machine-readable storage medium carrying one or more sequences of instructions which, when executed by one or more processors, causes the one or more processors to perform the method recited in claim 10.

36. A machine-readable storage medium carrying one or more sequences of instructions which, when executed by one or more processors, causes the one or more processors to perform the method recited in claim 19.

37. A machine-readable storage medium carrying one or more sequences of instructions which, when executed by one or more processors, causes the one or more processors to perform the method recited in claim 20.

38. The machine-readable medium of claim 21, wherein each data source in the plurality of data sources is a database, a database portion, a file server, or a group of one or more files stored in a persistent storage device.

* * * * *